(12) United States Patent
Gu et al.

(10) Patent No.: US 11,577,246 B2
(45) Date of Patent: Feb. 14, 2023

(54) MICROFLUIDIC DEVICE AND DETECTION METHOD THEREFOR

(71) Applicants: Beijing BOE Sensor Technology Co., Ltd., Beijing (CN); BOE TECHNOLOGY GROUP CO., LTD., Beijing (CN)

(72) Inventors: Le Gu, Beijing (CN); Peizhi Cai, Beijing (CN); Fengchun Pang, Beijing (CN); Yue Geng, Beijing (CN); Yingying Zhao, Beijing (CN); Haochen Cui, Beijing (CN); Yuelei Xiao, Beijing (CN); Hui Liao, Beijing (CN); Wenliang Yao, Beijing (CN); Nan Zhao, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 409 days.

(21) Appl. No.: 16/631,780

(22) PCT Filed: May 13, 2019

(86) PCT No.: PCT/CN2019/086630
§ 371 (c)(1),
(2) Date: Jan. 16, 2020

(87) PCT Pub. No.: WO2020/093675
PCT Pub. Date: May 14, 2020

(65) Prior Publication Data
US 2022/0023865 A1      Jan. 27, 2022

(30) Foreign Application Priority Data
Nov. 8, 2018  (CN) .......................... 201811326339.5

(51) Int. Cl.
*B01L 3/00* (2006.01)
*G01N 21/17* (2006.01)

(52) U.S. Cl.
CPC .... *B01L 3/502792* (2013.01); *G01N 21/1717* (2013.01); *B01L 2200/143* (2013.01);
(Continued)

(58) Field of Classification Search
CPC ....... B01L 3/502792; B01L 2300/0816; B01L 2400/0427; B01L 2300/161; B01L 2300/0645; G01N 21/1717
See application file for complete search history.

(56) References Cited

U.S. PATENT DOCUMENTS

| | | | |
|---|---|---|---|
| 2011/0247938 A1* | 10/2011 | Wang | B01L 3/502792 204/603 |
| 2019/0070602 A1 | 3/2019 | Han et al. | |

(Continued)

FOREIGN PATENT DOCUMENTS

| | | |
|---|---|---|
| CN | 101046457 A | 10/2007 |
| CN | 101666672 A | 3/2010 |

(Continued)

OTHER PUBLICATIONS

International Search Report Issued in Application No. PCT/CN2019/086630, dated Aug. 19, 2019, (10p).

*Primary Examiner* — Brian J. Sines
(74) *Attorney, Agent, or Firm* — Arch & Lake LLP

(57) ABSTRACT

A microfluidic device and a detection method for the microfluidic device are provided. The microfluidic device includes a driving substrate configured to drive a movement of a droplet; and a position detector configured to detect a position of the droplet on the driving substrate.

14 Claims, 8 Drawing Sheets

(52) U.S. Cl.
CPC ............... *B01L 2300/0645* (2013.01); *B01L 2300/0663* (2013.01); *B01L 2300/0816* (2013.01); *B01L 2300/161* (2013.01); *B01L 2400/0427* (2013.01); *G01N 2021/1729* (2013.01)

(56) References Cited

U.S. PATENT DOCUMENTS

| | | |
|---|---|---|
| 2019/0092623 A1 | 3/2019 | Ding et al. |
| 2019/0105655 A1 | 4/2019 | Dong et al. |

FOREIGN PATENT DOCUMENTS

| | | |
|---|---|---|
| CN | 202995684 U | 6/2013 |
| CN | 106446817 A | 2/2017 |
| CN | 107497509 A | 12/2017 |
| CN | 107583694 A | 1/2018 |
| CN | 107649223 A | 2/2018 |
| CN | 108169966 A | 6/2018 |
| JP | 2005069900 A | 3/2005 |

\* cited by examiner

MICROFLUIDIC DEVICE AND DETECTION METHOD THEREFOR

CROSS-REFERENCE TO RELATED APPLICATIONS

This application is the U.S. national phase of PCT Patent Application No. PCT/CN2019/086630 filed on May 13, 2019, which claims the priority of Chinese Patent Application No. 201811326339.5, filed on Nov. 8, 2018, the entire content of both of which is incorporated herein by reference in their entirety for all purposes.

FIELD

Embodiments of the present disclosure relate to a microfluidic device and a detection method for the microfluidic device.

BACKGROUND

The microfluidic technology is now a research hotspot, and microfluidic chips adopting the microfluidic technology may control the movement, separation, polymerization, chemical reaction, biodetection and other behaviors of tiny droplets. Microfluidic devices dealing with the precise control and manipulation of fluids, or droplets, are geometrically constrained to a small, typically sub-millimeter, scale.

SUMMARY

A microfluidic device and a detection method for the microfluidic device are disclosed.

According to a first aspect, there is provided a microfluidic device, comprising: a driving substrate configured to drive a movement of a droplet; and a position detector configured to detect a position of the droplet on the driving substrate.

In some embodiments, the driving substrate comprises: a base substrate; and a plurality of driving electrodes, located on the base substrate and configured to drive the droplet.

In some embodiments, the position detector comprises: an auxiliary substrate disposed above the driving substrate, a surface of the auxiliary substrate being allowed to contact with the droplet during operation; and a first optical assembly, comprising: a first light source configured to emit light entering the auxiliary substrate from a first side of the auxiliary substrate and cause the light to propagate in the auxiliary substrate in a total reflection manner; and a first light receiver configured to receive light exiting the auxiliary substrate from a second side of the auxiliary substrate opposite to the first side. The position detector further comprises: a second optical assembly, comprising: a second light source configured to emit light entering the auxiliary substrate from a third side of the auxiliary substrate and cause the light to propagate in the auxiliary substrate in a total reflection manner; and a second light receiver configured to receive light exiting the auxiliary substrate from a fourth side of the auxiliary substrate opposite to the third side. The driving substrate is configured to receive the droplet thereon, and the auxiliary substrate is spaced apart from the driving substrate to form a passage for the movement of the droplet on the driving substrate. The driving substrate further comprises a first hydrophobic layer facing the auxiliary substrate.

In some embodiments, the auxiliary substrate is configured to receive the droplet thereon, and allowing the droplet to move on a surface of the auxiliary substrate facing away from the driving substrate. The auxiliary substrate further comprises a second hydrophobic layer facing away from the driving substrate.

In some embodiments, the position detector comprises a plurality of droplet detectors, each of the droplet detectors comprising: an auxiliary electrode between the base substrate and a corresponding driving electrode; and a piezoelectric material layer, sandwiched between the auxiliary electrode and the corresponding driving electrode, for generating mechanical waves in response to an electrical field applied thereon. Each of the droplet detectors further comprises: a reflective layer, disposed at a side of the auxiliary electrode away from the piezoelectric material layer, for reflecting mechanical waves generated by the piezoelectric material. The reflective layer is an air layer and/or a Bragg film layer. The Bragg film layer has a laminated structure of different acoustic impedance films each having a thickness of ¼ wavelength of mechanical waves generated by the piezoelectric material layer. The Bragg film layer has a plurality of patterns arranged in an array on the base substrate. The piezoelectric material layer covers, and is in contact with, both the Bragg film layer and the base substrate. The driving electrodes are in contact with the piezoelectric material layer. Each one of the driving electrodes is of a dimension larger than a corresponding auxiliary electrode.

In some embodiments, the microfluidic device further comprises: a plurality of first signal lines and a plurality of second signal lines; a plurality of third signal lines and a plurality of fourth signal lines; and a reading circuit connected to the second signal lines and the fourth signal lines; wherein each droplet detector further comprises a first switching element having a gate electrode that is electrically connected to one of the plurality of first signal lines, a first electrode that is electrically connected to one of the plurality of second signal lines, and a second electrode that is electrically connected to the corresponding driving electrode, such that the first switching element enables conduction between the corresponding driving electrode and the reading circuit via the second signal line under the control of the first signal line; and each droplet detector further comprises a second switching element having a gate electrode that is electrically connected to one of the plurality of third signal lines, a first electrode that is electrically connected to one of the plurality of fourth signal lines, and a second electrode that is electrically connected to the corresponding auxiliary electrode, such that the second switching element enables conduction between the corresponding auxiliary electrode and the reading circuit via the fourth signal line under the control of the third signal line.

In some embodiments, the air layer is formed by etching away a sacrificial material to form an air cavity, and the air cavity is filled with inert gas.

According to a second aspect, there is provided a detection method for the microfluidic device, the method comprising: generating light to enter into the auxiliary substrate from the first side of the auxiliary substrate; receiving the light exiting the auxiliary substrate from the second side of the auxiliary substrate opposite to the first side; determining a light intensity decrease value of the received light in the direction of the second side; and determining a position of the light intensity decrease value in the direction of the second side as the position of the droplet in the direction of the second side.

In some embodiments, the method may comprise: generating light to enter into the auxiliary substrate from the first side of the auxiliary substrate; receiving the light exiting the auxiliary substrate from the second side of the auxiliary substrate opposite to the first side; determining a light intensity decrease value of the received light in the direction of the second side; determining a position of the light intensity decrease value in the direction of the second side as the position of the droplet in the direction of the second side; generating light to enter into the auxiliary substrate from the third side of the auxiliary substrate; receiving the light exiting the auxiliary substrate from the fourth side of the auxiliary substrate opposite to the third side; determining a light intensity decrease value of the received light in the direction of the fourth side; and determining a position of the light intensity decrease value in the direction of the fourth side as the position of the droplet in the direction of the fourth side.

The method may further comprise: electrically connecting one of the plurality of driving electrodes to the reading circuit, and connecting corresponding one of the plurality of auxiliary electrodes to the reading circuit; obtaining, by the reading circuit, a frequency of a mechanical wave generated by the piezoelectric material; determining a difference between the obtained frequency and a preset frequency; and determining, based on the difference, a position corresponding to the one of the plurality of the driving electrodes as the position of the droplet.

In some embodiments, electrically connecting the one of the plurality of driving electrodes to the reading circuit, and connecting the corresponding one of the plurality of auxiliary electrodes to the reading circuit, includes: providing a signal capable of turning on the first switching element on the first signal line corresponding to the one of the plurality of driving electrodes, and simultaneously providing a signal capable of turning on the second switching element on the third signal line corresponding to the corresponding one of the plurality of auxiliary electrodes.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings.

DETAILED DESCRIPTION

Figure 1:
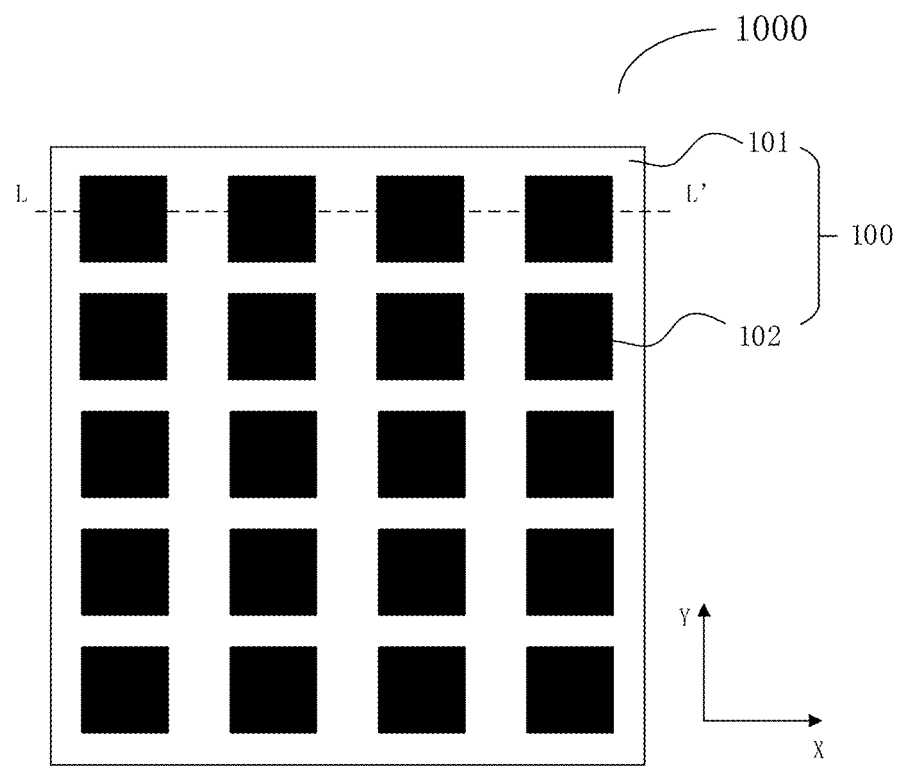
FIG. 1 is a schematic plan view illustrating the driving electrode array of the microfluidic device according to some embodiments of the present disclosure.

The disclosure will be described hereinafter with reference to the accompanying drawings which illustrate embodiments of the disclosure. This disclosure can, however, be implemented in many other forms and shall not be construed as limited to the illustrated embodiments set forth herein. In the specification, similar numerals represent similar components.

The terms used herein are merely for describing specific embodiments, and are not intended to limit the disclosure. As used herein, the singular forms "a" and "an" are intended to include the plural forms as well, unless otherwise indicated clearly in the context. It is to be further understood that the terms "comprise" and/or "include" used herein indicate the presence of the described features, entirety, steps, operations, elements and/or components, but do not exclude the presence or addition of one or more other features, entirety, steps, operations, elements, components and/or combinations thereof. It should also be understood that the term "and/or" as used herein refers to and includes any and all possible combinations of one or more of the associated listed items.

Unless otherwise defined, all the terms (including technical and scientific terms) used herein have the same meaning as commonly understood by one of ordinary skill in the art. It is to be further understood that the terms should be interpreted as having a meaning that is consistent with their meaning in the context of the specification and in the relevant art rather than in an idealized or overly formal sense unless expressly so defined here.

In the disclosure, "preset", "predetermine" and the like may be a condition that a value and a parameter is pre-stored in the machine-aided dialog system, or a condition that a group of or multiple groups of values and parameters is pre-stored in the machine-aided dialog system and then is selected for use, or a condition that a value and a parameter is selectively input to the machine-aided dialog system when in use, or a condition that a value and a parameter stored in the machine-aided dialog system is updated in real time or regularly.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

During the droplet operation, digital microfluidic chips need to monitor the position of the droplet in real time for the following droplet manipulation or processing. For example, a droplet position feedback signal is obtained to guide the sequence for powering up the electrodes to enable the droplet to keep moving in the expected direction; or the signal may be used to control a heating device to accurately position the droplet for heating up. If the position information of the droplet is lacking, precise control of the droplet may not be achieved.

At least one embodiment of the present disclosure provides a microfluidic device comprising: a driving substrate and a detection unit, i.e. a position detector, capable of detecting a position of the droplet on the driving substrate. The driving substrate includes a first substrate, i.e. a first base substrate, and a plurality of driving electrodes on the first substrate and used to drive the droplets.

A microfluidic device provided by embodiments of the present disclosure may be based on, for example, an on-medium electrowetting technology. The on-medium electrowetting technology refers to a technology that changes the contact angle of the droplet on the medium surface by applying a voltage signal and causes an asymmetrical deformation of the droplet to thereby generate an internal force to achieve droplet manipulation.

In the microfluidic device according to embodiments of the present disclosure, the first base substrate may be made of a rigid material or a flexible material. For example, the first base substrate may be made of glass, ceramic, silicon, metal, polyimide, etc., and may further cover a buffer layer or the like on the first base substrate as needed, and then form functional structures, such as, electrodes, on the buffer layer. The first base substrate can support elements formed thereon. The driving electrode may be formed by any suitable conductive material such as metal, metal alloy, indium tin oxide (ITO) or the like, and the driving electrode may be formed on the first base substrate by sputtering, vapor deposition, spray coating, or other methods, and may be formed with an appropriate shape as needed using a patterning process. A driving signal line for transmitting a driving signal is also correspondingly formed on the first base substrate, and coupled to the driving electrode via a driving circuit. The driving signal line is electrically connected to the driving IC, for example, in a bonding manner, and the driving electrode receives a driving signal from a driving signal line that is disposed on the first base substrate to drive the droplet in the microfluidic device according to the driving signal.

FIG. 1 is a schematic plan view illustrating a driving electrode array of the microfluidic device according to some embodiments of the present disclosure, and the microfluidic device is, for example, configured to form a microfluidic chip. As illustrated in FIG. 1, the microfluidic device 1000 according to some embodiments of the present disclosure comprises: a driving substrate 100 that comprises a first base substrate 101 and a plurality of driving electrodes 102 located on the first base substrate 101, the plurality of driving electrodes 102 being arranged as an electrode array having a plurality of rows and columns and being insulated from each other.

Specifically, the plurality of driving electrodes 102 is electrically insulated from each other and can be individually controlled in operation by receiving the driving signal from the driving signal line. With the driving signal applied, the electrode array may drive the droplet including the sample to move along the array, for example, in a row direction, a column direction, or other directions, and further may perform other operations, such as droplet separation, polymerization, chemical reaction, biodetection, etc., in cooperation with other components (not shown) as needed.

According to some embodiments of the present disclosure, the detecting unit or the position detector capable of detecting a position of the droplet may comprise an auxiliary substrate and an optical assembly. The auxiliary substrate is disposed above and in parallel with the driving substrate (that is, plate surfaces of the two are parallel to each other), and the surface of the auxiliary substrate is allowed to contact with the droplet during operation to position the droplet. The optical assembly comprises a light source and a light receiver, wherein the light source is configured to emit light entering the auxiliary substrate from at least one first side of the auxiliary substrate and cause the light to propagate in the auxiliary substrate in a total reflection manner, and the light receiver is configured to receive light exiting the auxiliary substrate from a second side of the auxiliary substrate opposite to the at least one first side.

The auxiliary substrate is at least partially transparent, and the auxiliary substrate allows light to propagate inside thereof. For example, the auxiliary substrate may be made of glass or plastic; or the auxiliary substrate may comprise a laminate structure formed by layers of glass or plastic and/or layers of other at least partially transparent materials. For example, glass-based devices not only can avoid expensive experiment equipment, but also can increase portability and reduce the experiment cost.

In some embodiments, a channel, or a passage, that allows droplet movement is provided between the driving substrate and the auxiliary substrate that are parallel to each other. The driving substrate is configured to drive the droplet applied to the surface of the driving substrate facing the auxiliary substrate, and the surface of the auxiliary substrate facing the driving substrate is in contact with the droplet during operation such that the position of the droplet may be detected.

In other embodiments, the surface of the auxiliary substrate distal from the driving substrate, i.e. the surface of the auxiliary substrate facing away from the driving substrate is in contact with the droplet, and the driving substrate is configured to drive via the auxiliary substrate the droplet applied to the surface of the auxiliary substrate facing away from the driving substrate.

In embodiments of the present disclosure, the light source for the optical assembly may be a point light source, a line light source, a surface light source or a combination of multiple point light sources. The light source may be a light emitting diode, a cold cathode fluorescent lamp, an electroluminescent light source, a flat fluorescent lamp, a laser light source, etc., and the emitted light may be visible light, infrared light or the like, which is not limited by embodiments of the present disclosure. The light emitted from the light source enters the auxiliary substrate from at least one side of the auxiliary substrate, and causes the light to propagate in the auxiliary substrate in a direction away from the light source in a total reflection manner. That is, the light is totally reflected on both plate surfaces of the auxiliary substrate repeatedly, so that it may propagate in a direction away from the light source. The total reflection means that, when the light is incident to an optically rare medium from an optically dense medium, the refraction angle is 90° if the incidence angle onto an interface of the two mediums is a critical angle, and if the incidence angle increases greater than the critical angle, the light would be no longer refracted but reflected, that is, the light returns to the optically dense medium without entering into the optically rare medium. Here, the auxiliary substrate is an optically dense medium with respect to the medium at both sides (for example, an air layer), thus, total reflection is allowed on its surfaces at two sides. Therefore, the light emitted from the light source is incident into the auxiliary substrate in a predetermined direction (at a predetermined angle with respect to the first side of the auxiliary substrate) to satisfy the condition for total reflection. For example, the light emitted from the light source may be converted into parallel light by means of optical devices (for example, concave mirrors, plane mirrors, etc.), and then injected into the auxiliary substrate in a predetermined direction to satisfy the condition for total reflection.

In embodiments of the present disclosure, the light receiver for the optical assembly comprises, for example, an optical sensor and a driving circuit for the optical sensor. For example, the optical sensor implements the detection by sensing irradiation of different light intensities to produce photocurrents having different strengths or different amounts of photocharges. For example, the optical sensor may be a photodiode, a phototransistor, etc.; and the photodiode may be a PIN diode, a PN diode, etc., or may be a silicon-based diode or a non-silicon-based diode, etc. Embodiments of the present disclosure do not limit the specific type and structure of the light receiver.

Figure 2:
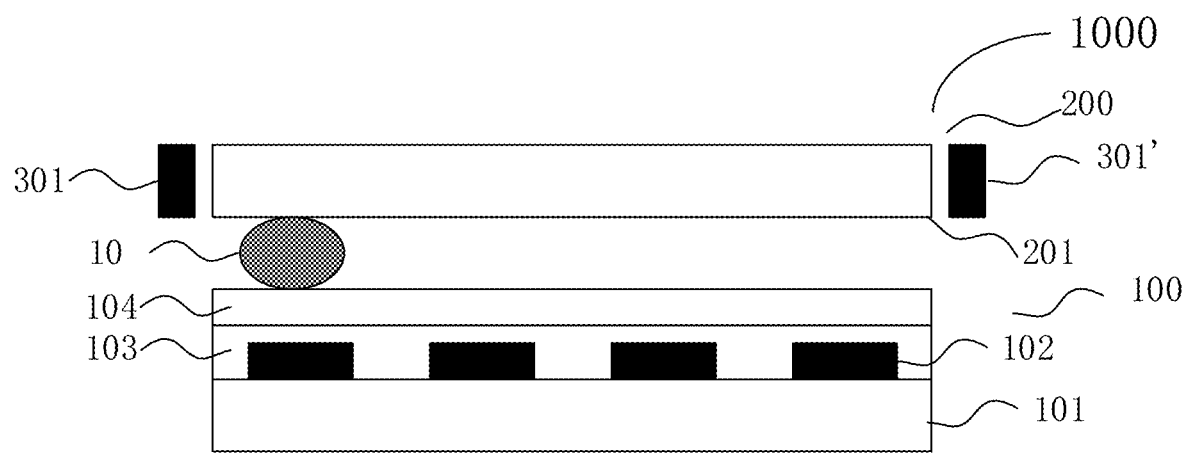
FIG. 2 is a schematic sectional view illustrating the microfluidic device according to some embodiments of the present disclosure.

FIG. 2 is a schematic sectional view illustrating the microfluidic device 1000 taken along line L-L' of FIG. 1 according to some embodiments. In FIG. 2, a droplet 10 is illustrated for convenience of description. As illustrated in FIG. 2, the microfluidic device 1000 comprises a detecting unit or a position detector that may detect position of the droplet. The detecting unit comprises an auxiliary substrate 200 and an optical assembly, and the optical assembly comprises a light source 301 and a light receiver 301'. The auxiliary substrate 200 is disposed above and in parallel with the driving substrate 100. For example, the auxiliary substrate 200 and the driving substrate 100 are relatively fixed by a sealant, a spacer, or the like, and remain a space therebetween for applying the droplet, and the surface of the auxiliary substrate 200 is allowed to contact with the droplet 10 during operation. For example, if the space between the auxiliary substrate 200 and the driving substrate 100 is relatively fixed, the surface of the auxiliary substrate 200 may be brought into contact with the droplet 10 during operation by controlling the size of the applied droplet; as another example, if the space between the auxiliary substrate 200 and the driving substrate 100 is not relatively fixed but adjustable as needed, the surface of the auxiliary substrate 200 may be brought into contact with the droplet 10 during operation by adjusting the space. The auxiliary substrate 200 comprises a second base substrate 201. The second base substrate 201 is at least partially transparent, and the second base substrate 201 allows light to propagate inside thereof. For example, the second base substrate 201 may be made of glass or plastic.

The light source 301 is disposed at a first side of the auxiliary substrate 200 (e.g., the left side in FIG. 2), and the light receiver 301' is disposed at a second side of the auxiliary substrate 200 opposite to the first side (e.g., the right side in FIG. 2). However, it should be understood that the light source 301 may also be disposed at a second side of the auxiliary substrate 200 (e.g., the right side in FIG. 2), and the light receiver 301' may be disposed at a first side of the auxiliary substrate 200 (e.g., the left side in FIG. 2). The present disclosure gives no limitation hereto.

In FIG. 2, a channel that allows movement of the droplet 10 is provided between the driving substrate 100 and the auxiliary substrate 200. The driving substrate 100 is configured to drive the droplet 10 applied to the surface of the driving substrate 100 facing the auxiliary substrate 200, and the surface of the auxiliary substrate 200 facing the driving substrate 100 is in contact with the droplet 10 during the operation. When there is no droplet, the surface of the auxiliary substrate 200 facing the driving substrate 100 is in contact with the air layer, thus, the light incident from the light source 301 at an angle meeting the total reflection can be totally reflected on the surfaces of the auxiliary substrate 200 and propagate in a direction away from the light source 301 (from left to right in FIG. 2) until the light is emitted from the auxiliary substrate 200 and irradiated to the light receiver 301' that then detects intensity of the light. However, when there is a droplet 10 and the refractive index of the droplet 10 is equal to or greater than the refractive index of the auxiliary substrate 200, the droplet 10 is in contact with the surface of the auxiliary substrate 200 facing the driving substrate 100, and at this contact position, the surface of the auxiliary substrate 200 facing the driving substrate 100 is no longer in contact with the air layer, so that the condition for total reflection of the auxiliary substrate 200 is no longer satisfied at this contact position. Thus, the light propagating in the auxiliary substrate 200 in the total reflection manner may be at least partially emitted from the position of the auxiliary substrate 200 in contact with the droplet 10, causing the energy of the light to be attenuated, and accordingly, changes in intensity of the light are detected by the light receiver 301' to thereby determine the position of the droplet in the extended direction of the second side (for example, the Y direction in FIG. 1). For example, the position corresponding to the light intensity decrease value in the direction of the second side (for example, the Y direction in FIG. 1) may be determined as the position of the droplet in the direction of the second side (for example, the Y direction in FIG. 1). In some embodiments, the light receiver 301' may comprise a plurality of optical sensors arranged in a row along the auxiliary substrate 200.

In the microfluidic device according to some embodiments of the present disclosure, the driving substrate further comprises a first hydrophobic layer located on a surface of the driving electrode facing the auxiliary substrate. The first hydrophobic layer facilitates the driving of the droplet by the driving electrodes on the driving substrate, and thereby better controls the droplet.

In the microfluidic device according to some embodiments of the present disclosure, the auxiliary substrate further comprises a second hydrophobic layer located on a surface of the second base substrate facing the driving substrate. The second hydrophobic layer also facilitates the driving of the droplet between the driving substrate and the auxiliary substrate by the driving electrodes, and thereby better controls the droplet.

As illustrated in FIG. 2, the driving substrate 100 further comprises a first hydrophobic layer 104 disposed on a surface of the driving electrode 102 facing the auxiliary substrate 200.

Figure 3A:
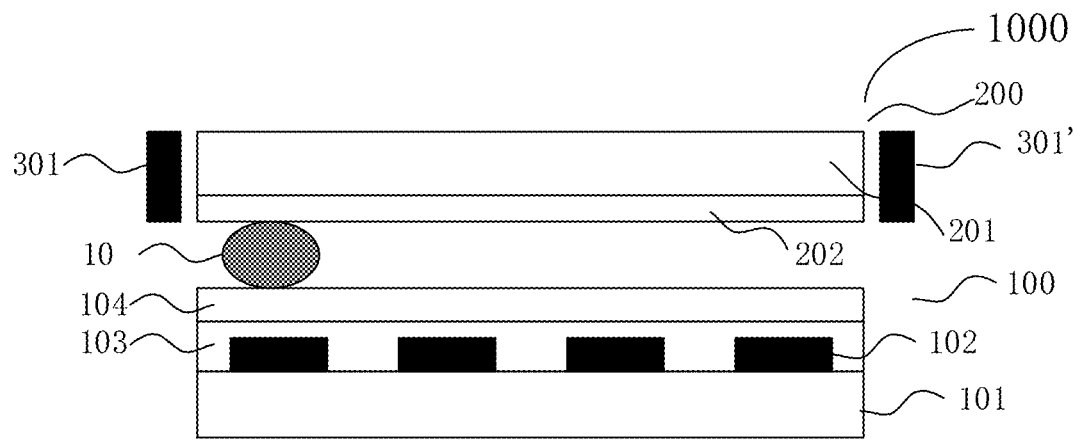
FIG. 3A is a schematic sectional view illustrating the microfluidic device according to some embodiments of the present disclosure.

As illustrated in FIG. 3A, the driving substrate 100 further comprises a first hydrophobic layer 104 disposed on a surface of the driving electrode 102 facing the auxiliary substrate 200; and the auxiliary substrate 200 further comprises a second hydrophobic layer 202 disposed on a surface of the second base substrate 201 facing the driving substrate 100.

Figure 3B:
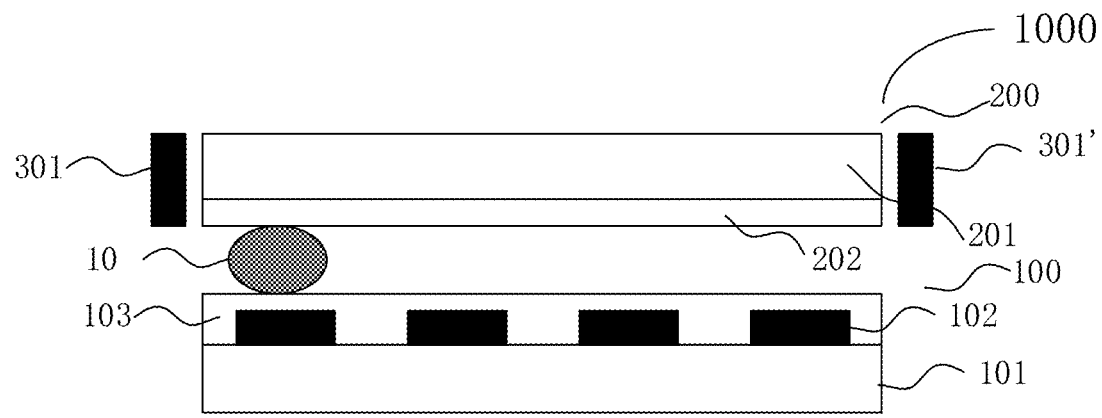
FIG. 3B is a schematic sectional view illustrating the microfluidic device according to some embodiments of the present disclosure.

As illustrated in FIG. 3B, the auxiliary substrate 200 comprises a second hydrophobic layer 202 disposed on a surface of the second base substrate 201 facing the driving substrate 100.

In above embodiments, the refractive index of the second hydrophobic layer 202 on the surface of the second base substrate 201 facing the driving substrate 100 is greater than the refractive index of the second base substrate 201, and is also greater than the refractive index of the air layer. When there is a second hydrophobic layer 202 and no droplet is present, the total reflection of the light emitted from the light source 301 may not occur between the second base substrate 201 and the second hydrophobic layer 202, but occur at the interface between the second hydrophobic layer 202 and the air layer and at the interface between the second base substrate 201 and the air layer. However, when there is a droplet 10 and the refractive index of the droplet 10 is greater than or equal to the refractive index of the second hydrophobic layer 202, the droplet 10 is in contact with the surface of the second hydrophobic layer 202 facing the driving substrate 100, and at this position, the surface of the second hydrophobic layer 202 facing the driving substrate 100 is no longer in contact with the air layer, so that the condition for total reflection of the auxiliary substrate 200 is no longer satisfied at this position. Thus, the light propagating in the auxiliary substrate 200 in the total reflection manner may be partially emitted from the position of the auxiliary substrate 200 in contact with the droplet 10, causing the energy of the light to be attenuated, and accordingly, changes in intensity of the light are detected by the light receiver 301' to thereby determine the position of the droplet in the direction of the second side (for example, the Y direction in FIG. 1).

The first hydrophobic layer 104 and the second hydrophobic layer 202 may increase the surface tension gradient to facilitate movement of the droplet 10, and the first hydrophobic layer 104 and the second hydrophobic layer 202 may be formed of Teflon, for example.

In the microfluidic device according to some embodiments of the present disclosure, the driving substrate 100 may further comprise an insulating layer 103 to electrically insulate the driving electrodes 102 from the droplet 10. The insulating layer 103 may also function as a flat layer such that the driving substrate 100 has a flat surface. For example, the insulating layer 103 may be formed of an inorganic insulating material or an organic insulating material, such as resin, but the present disclosure gives no limitation hereto. In a case of the embodiment illustrated in FIG. 3B, the insulating layer 103 may also have a hydrophobic property, thereby functioning as a hydrophobic layer.

Figure 4:
FIG. 4 is a schematic sectional view illustrating the microfluidic device according to some embodiments of the present disclosure.

FIG. 4 is a schematic sectional view illustrating the microfluidic device 1000 taken along line L-L' of FIG. 1 according to some other embodiments. The auxiliary substrate 200 and the driving substrate 100 are laminated to and in full contact with each other, whereby the auxiliary substrate 200 is configured to allow the droplet 10 to move on the surface of the auxiliary substrate 200 facing away from the driving substrate 100, and the driving electrode 102 on the first base substrate 101 is configured to drive the droplet 10 applied to the surface of the auxiliary substrate 200 facing away from the driving substrate 100. For example, the microfluidic device 1000 may further comprise a cover (not shown) to form with the auxiliary substrate 200 a space for movement of the droplet, and to prevent the droplet from being adversely affected by the outside. For example, in the microfluidic device 1000, the auxiliary substrate 200 may further comprise a third hydrophobic layer 203 disposed on a surface of the second base substrate 201 facing away from the first base substrate 101. The refractive index of the third hydrophobic layer 203 is greater than the refractive index of the second base substrate 201, and is also greater than the refractive index of the air layer. Similarly, the third hydrophobic layer 203 may increase the surface tension gradient to facilitate movement of the droplet 10, and the third hydrophobic layer 203 may be formed of Teflon, for example.

Furthermore, it should also be understood that the microfluidic device according to embodiments of the present disclosure may comprise a plurality of optical assemblies that are respectively disposed at different groups of opposing sides of the auxiliary substrate. For example, in embodiments illustrated in FIGS. 5A and 5B, the optical assembly may comprise a first optical assembly and a second optical assembly, wherein the first optical assembly comprises a light source 301 and a light receiver 301', and the second optical assembly comprises a light source 302 and a light receiver 302', the first optical assembly being disposed at left and right sides of the auxiliary substrate 200, and the second optical assembly being disposed at upper and lower sides of the auxiliary substrate 200. It may be determined from the first optical assembly the position of the droplet 10 in the direction of the first group of opposing sides (left and right sides) of the auxiliary substrate 200 (such as, the Y direction in FIGS. 5A and 5B), and it may be determined from the second optical assembly the position of the droplet 10 in the direction of the second group of opposing sides (upper and lower sides) of the auxiliary substrate 200 (such as, the X direction in FIGS. 5A and 5B). Changes in intensity of the light in the direction (such as, the Y direction in FIGS. 5A and 5B) of the first group of opposing sides are determined by the light receiver 301', such that the position corresponding to the light intensity decrease value in the direction of the first group of opposing sides (such as, the Y direction in FIGS. 5A and 5B) may be determined as the position of the droplet 10 in the direction of the first group of opposing sides (such as, the Y direction in FIGS. 5A and 5B), as illustrated in FIG. 6A. For example, the position at which a minimum light intensity is detected as shown in FIG. 6A may be determined as the position of the droplet in the direction of the first group of opposing sides (such as, the Y direction in FIGS. 5A and 5B). Changes in intensity of the light in the direction (such as, the X direction in FIGS. 5A and 5B) of the second group of opposing sides are determined by the light receiver 302', such that the position corresponding to the light intensity decrease value in the direction of the second group of opposing sides (such as, the X direction in FIGS. 5A and 5B) may be determined as the position of the droplet 10 in the direction of the second group of opposing sides (such as, the X direction in FIGS. 5A and 5B), as illustrated in FIG. 6B. For example, the position at which a minimum light intensity is detected as shown in FIG. 6B may be determined as the position of the droplet in the direction of the second group of opposing sides (such as, the X direction in FIGS. 5A and 5B).

In some embodiments, the light receiver may also comprise a plurality of optical sensors arranged in a row along the auxiliary substrate. As illustrated in FIG. 5B, the light receiver 301' comprises a plurality of optical sensors 3011' arranged in a row along the auxiliary substrate 200, and the light receiver 302' comprises a plurality of optical sensors 3012' arranged in a row along the auxiliary substrate 200.

Figure 5A:
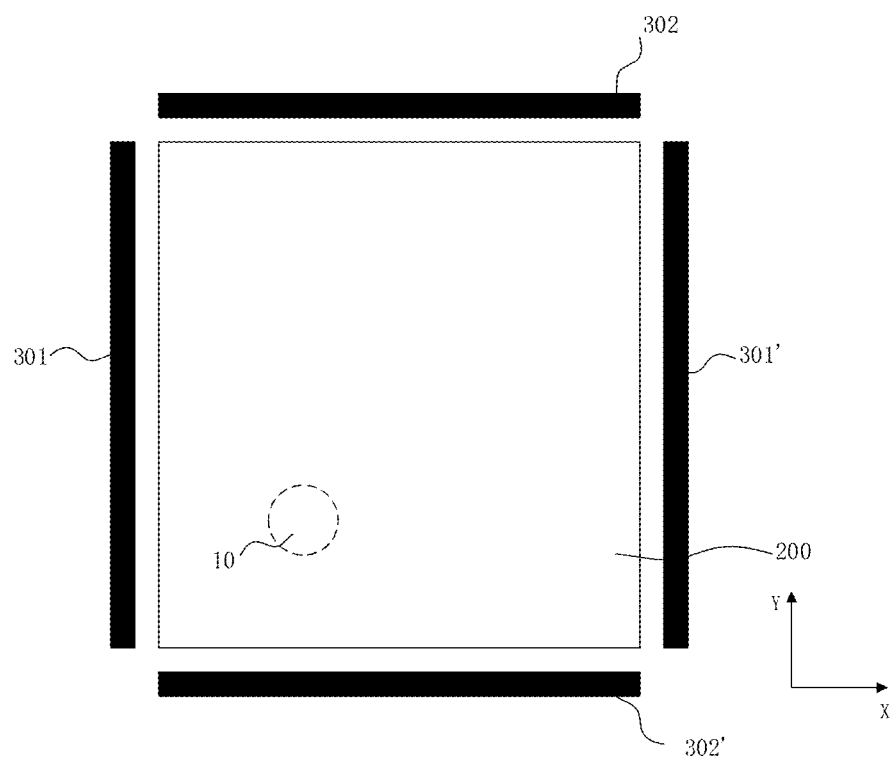
FIG. 5A is a schematic top view illustrating the auxiliary substrate of the microfluidic device according to some embodiments of the present disclosure.
Figure 5B:
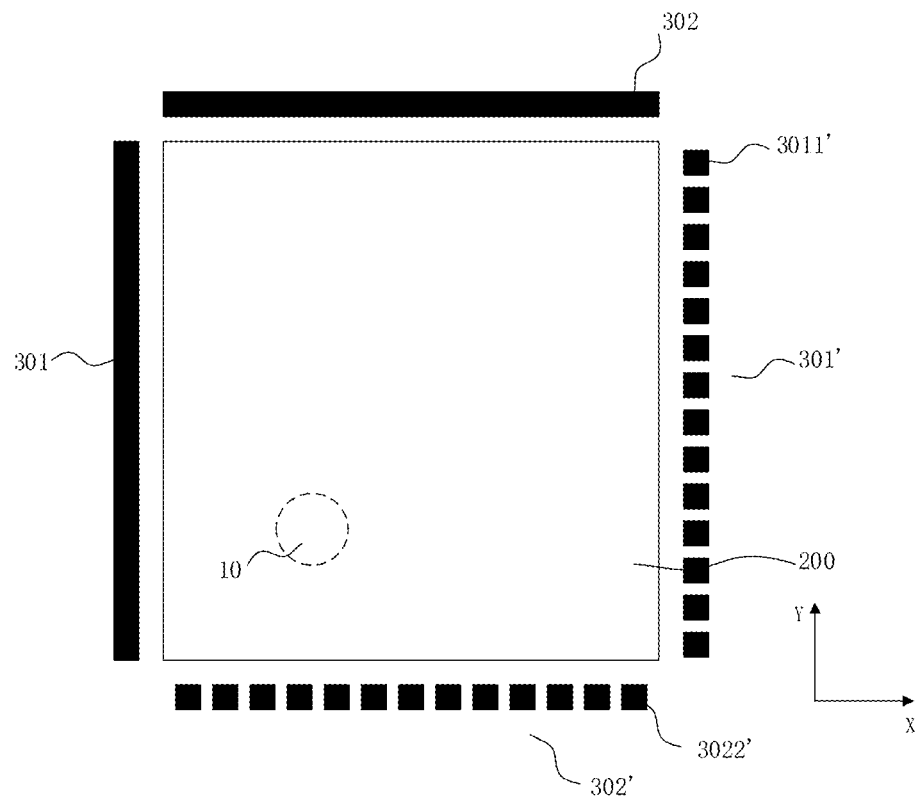
FIG. 5B is a schematic top view illustrating the auxiliary substrate of the microfluidic device according to some embodiments of the present disclosure.
Figure 6A:
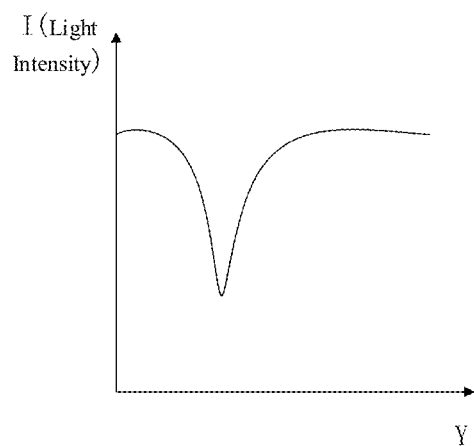
FIGS. 6A-6B are diagrams illustrating relation between the light intensity and the position according to some embodiments of the present disclosure.
Figure 6B:
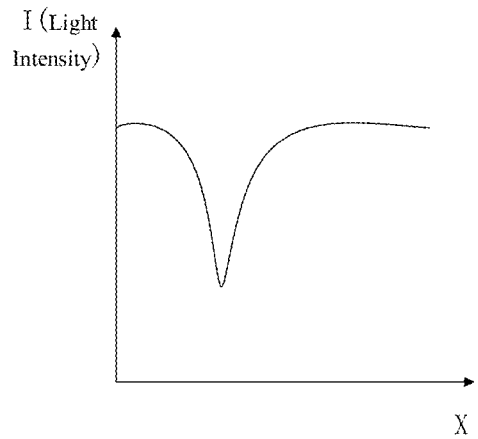

It should be also understood that although the auxiliary substrate 200 illustrated in FIGS. 5A and 5B has a rectangular shape, the auxiliary substrate 200 may also be formed with other polygonal shapes (such as, hexagonal, octagonal, or 2N-polygonal shapes, where N is a positive integer of 5 or more), and by disposing a plurality of optical assemblies along multiple groups of opposing sides of the auxiliary substrate 200, the positions of the droplet in the directions of the multiple groups of the opposing sides can be determined.

The microfluidic device according to at least one embodiment of the present disclosure can accurately position or locate the droplet, and thereby facilitate the operation to the droplet.

Figure 7:
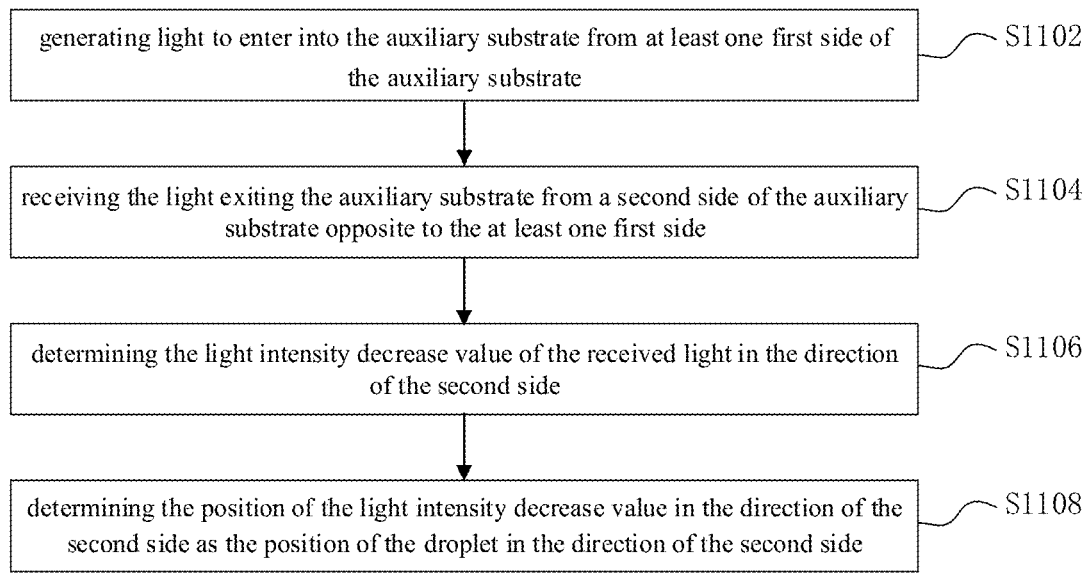
FIG. 7 is a schematic flow diagram illustrating a detection method for the microfluidic device according to some embodiments of the present disclosure.

At least one embodiment of the present disclosure further provides a detection method 1100 for the microfluidic device according to the foregoing embodiments. As illustrated in FIG. 7, the method comprises steps as follows:

S1102: causing or generating light to enter into the auxiliary substrate from at least one first side of the auxiliary substrate;

S1104: receiving the light exiting the auxiliary substrate from a second side of the auxiliary substrate opposite to the at least one first side;

S1106: determining the light intensity decrease value of the received light in the direction of the second side; and S1108: determining the position of the light intensity decrease value in the direction of the second side as the position of the droplet in the direction of the second side.

The detection method 1100 can be implemented in the microfluidic device according to embodiments of the present disclosure as illustrated in FIG. 2 to FIG. 5B above. For example, the detection result is output only when the light intensity decrease value exceeds a threshold. As another example, the above method is performed by detecting a minimal value of the light intensity detection value.

For example, the step S1102 may comprise: emitting via the light source 301 the light entering into the auxiliary substrate 200 from the left side of the auxiliary substrate 200; or emitting via the light source 302 the light entering into the auxiliary substrate 200 from the upper side of the auxiliary substrate 200; or emitting via the light source 301 and the light source 302 the light entering into the auxiliary substrate 200 from the left side and upper side of the auxiliary substrate 200 respectively.

For example, the step S1104 may comprise: receiving via the light receiver 301' the light exiting the auxiliary substrate 200 from the right side of the auxiliary substrate 200; or receiving via the light receiver 302' the light exiting the auxiliary substrate 200 from the lower side of the auxiliary substrate 200; or emitting via the light receiver 301' and the light receiver 302' the light exiting the auxiliary substrate 200 from the right side and lower side of the auxiliary substrate 200 respectively.

For example, the step S1106 may comprise: determining based on the output signal of the light receiver 301' the light intensity decrease value of the received light in the direction of the right side; or determining based on the output signal of the light receiver 302' the light intensity decrease value of the received light in the direction of the lower side; or determining based on the output signals of the light receiver 301' and light receiver 302' the light intensity decrease value of the received light respectively in the direction of the right side and that of the lower side.

For example, the step S1108 may comprise: determining the position of the light intensity decrease value in the direction of the right side as the position of the droplet in the direction of the right side; or determining the position of the light intensity decrease value in the direction of the lower side as the position of the droplet in the direction of the lower side; or determining the positions of the light intensity decrease value in the directions of the right side and the lower side as the positions of the droplet in the directions of the right side and the lower side respectively.

In some embodiments, the step S1108 may comprise determining the position of a maximal value of the light intensity decrease values in the direction of the second side as the position of the droplet in the direction of the second side. In some other embodiments, the step S1108 may further comprise determining the position of a maximum value of the light intensity decrease values in the direction of the second side as the position of the droplet in the direction of the second side.

The detection method for the microfluidic device according to at least one embodiment of the present disclosure can accurately position the droplet, and thereby facilitate the operation to the droplet.

According to some embodiments of the present disclosure, the position detector capable of detecting position of the droplet may comprise a plurality of detecting sub-units or droplet detectors, and each of the droplet detectors comprises: an auxiliary electrode between the first base substrate and a corresponding driving electrode; a piezoelectric material (or a piezoelectric material layer) sandwiched between the auxiliary electrode and the corresponding driving electrode, and a reflective layer disposed at a side of the auxiliary electrode away from the piezoelectric material to reflect mechanical waves generated by the piezoelectric material.

The auxiliary electrode may be disposed at a side of the at least one driving electrode facing the first base substrate, and may be disposed to face toward at least one driving electrode, and the projection of the auxiliary electrode on the first base substrate at least partially overlaps with the projection of the at least one driving electrode on the first base substrate. The auxiliary electrode may be formed by any suitable material such as metal, metal alloy, indium tin oxide (ITO) or the like. The auxiliary electrode may be formed on the first base substrate by sputtering, vapor deposition, spray coating, among others, and may be formed with an appropriate shape as needed using a patterning process.

The auxiliary electrode and the driving electrode may be made of the same or different materials, which is not limited by embodiments of the present disclosure. For example, the auxiliary electrode and the driving electrode may be formed of aluminum, platinum, gold, molybdenum or the like. The driving signal line for transmitting the driving signal is also correspondingly formed on the first base substrate, and coupled to the driving electrode via a driving circuit. The driving signal line is electrically connected to the driving IC, for example, in a bonding manner. The auxiliary electrode and the driving electrode may be connected to different driving signal lines formed on the first base substrate, so as to be driven by different signals.

The piezoelectric material may comprise an inorganic piezoelectric material, an organic piezoelectric material, or a composite piezoelectric material. For example, the piezoelectric material may comprise lead zirconate titanate (PZT), zinc oxide, aluminum nitride, polyvinyl chloride, or a combination thereof.

The reflective layer, which is disposed on the side of the auxiliary electrode away from the piezoelectric material for reflecting the mechanical waves generated by the vibration of the piezoelectric material, may be an air layer or a Bragg film layer. The Bragg film layer, or Bragg composite film, has a stacked, or laminated, structure of different acoustic impedance films each having a thickness of ¼ wavelength, so as to reflect the mechanical waves generated by the piezoelectric material layer when a driving signal is applied to the driving electrode and auxiliary electrode. For example, the Bragg composite film layer may comprise a plurality of alternatively stacked high-impedance film layers and low-impedance film layers. The high-impedance film layer may be, for example, a tungsten thin film layer, and the low-impedance film layer may be, for example, a silicon dioxide thin film layer. The Bragg composite film layer may be formed on the first base substrate by deposition or the like.

The driving electrode, piezoelectric material and auxiliary electrode form a film bulk acoustic resonator structure, and the film bulk acoustic resonator structure converts electrical energy into sound waves by a reverse piezoelectric effect of the piezoelectric material and thereby forms a resonance. For example, when an alternating voltage signal is applied to the driving electrode and the auxiliary electrode, the piezoelectric material disposed between the driving electrode and the auxiliary electrode is mechanically deformed due to the inverse piezoelectric effect, causing the piezoelectric material to expand or shrink as the electric field changes, thereby forming vibration. The vibration is generated from the body of the piezoelectric material, exciting bulk acoustic waves propagating along the thickness direction of the piezoelectric material. The bulk acoustic waves will be reflected back as propagating to the reflective layer, and thereby form vibrations by reflecting back and forth within the piezoelectric material. A standing wave is formed when the propagation of the bulk acoustic waves in the piezoelectric material is exactly a half wavelength or an odd multiple of the half wavelength. At this time, the frequency of the bulk acoustic waves is the resonant frequency of the bulk acoustic wave resonator structure.

The aforesaid inverse piezoelectric effect refers to a mechanical deformation phenomenon of the piezoelectric material which is caused by applying an electric field to the piezoelectric material, that is, the electrical energy is converted into mechanical energy.

Figure 8:
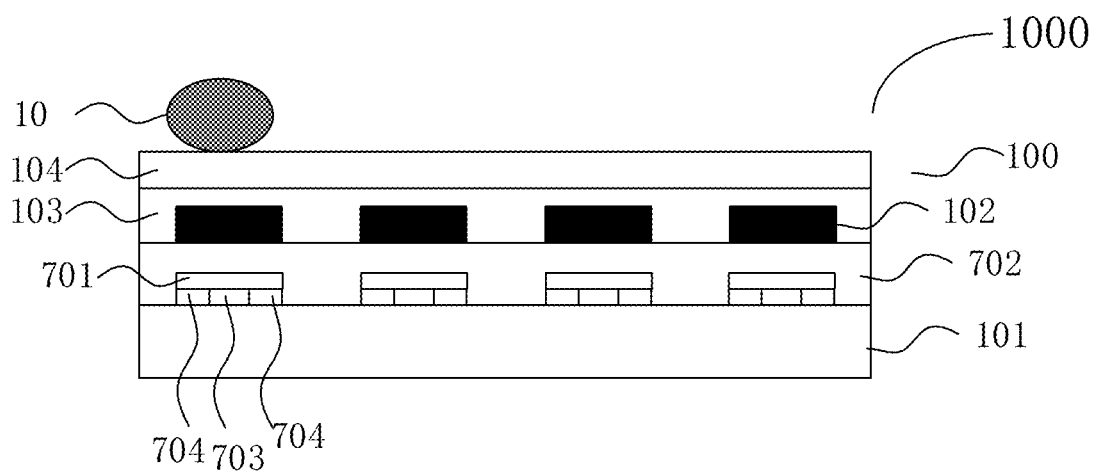
FIG. 8 is a schematic sectional view illustrating the microfluidic device according to some embodiments of the present disclosure.

FIG. 8 is a schematic sectional view illustrating the microfluidic device 1000 taken along line L-L' of FIG. 1 according to some embodiments. In FIG. 8, a droplet 10 is illustrated for convenience of description. As illustrated in FIG. 8, the microfluidic device 1000 comprises a detecting unit or a position detector that can detect position of the droplet. The position detector comprises a plurality of detecting sub-units or droplet detectors, and each of the droplet detectors comprises an auxiliary electrode 701, a piezoelectric material 702, and a reflective layer 703. The auxiliary electrode 701 is disposed on a side of the driving electrode 102 facing the first base substrate 101. The piezoelectric material 702 is disposed between the driving electrode 102 and the auxiliary electrode 701, and the driving electrode 102 is in contact with the piezoelectric material 702. The reflective layer 703 is disposed on a side of the auxiliary electrode 701 away from the piezoelectric material 702 to reflect the mechanical waves generated by the piezoelectric material 702. For example, the microfluidic device 1000 may further comprise a cover, and the cover is disposed in parallel with the first base substrate 101 to define with the first base substrate 101 a space for flow of the droplet, and to prevent the droplet from being adversely affected by the outside.

In some embodiments, each one of the driving electrodes may be of a dimension larger than a corresponding auxiliary electrode. The driving electrodes may completely or partially cover the auxiliary electrodes. In some other embodiments, the driving electrode may have a substantially same dimension as the corresponding auxiliary electrode, or a smaller dimension.

When the droplet 10 is located above the driving electrode 102, a load is generated on the film bulk acoustic resonator structure formed by the driving electrode 102, the piezoelectric material 702 and the auxiliary electrode 701 due to gravity of the droplet 10, which causes the resonant frequency of the film bulk acoustic resonator structure to change, and thereby can determine the position of the droplet by detecting the resonant frequency of respective film bulk acoustic resonator structures in the microfluidic device 1000.

In FIG. 8, the reflective layer 703 is an air layer (the air comprises atmosphere or inert gas, etc.), and in this case, the microfluidic device 1000 may further comprise a substrate 704 disposed at a side of the auxiliary electrode 701 distal from the piezoelectric material 702. For example, as illustrated by FIG. 8, the reflective layer 703 is formed in the substrate 704. A cavity may be etched in the substrate 704 for depositing a sacrificial material therein, and then the reflective layer 703 may be obtained by etching away the sacrificial material to form an air cavity after forming the auxiliary electrode 701, the piezoelectric material 702 and the driving electrode 102 above the sacrificial material. The substrate 704 may be formed of, for example, silicon and/or silicon dioxide, and the sacrificial material may be, for example, phosphor quartz glass.

Figure 9:
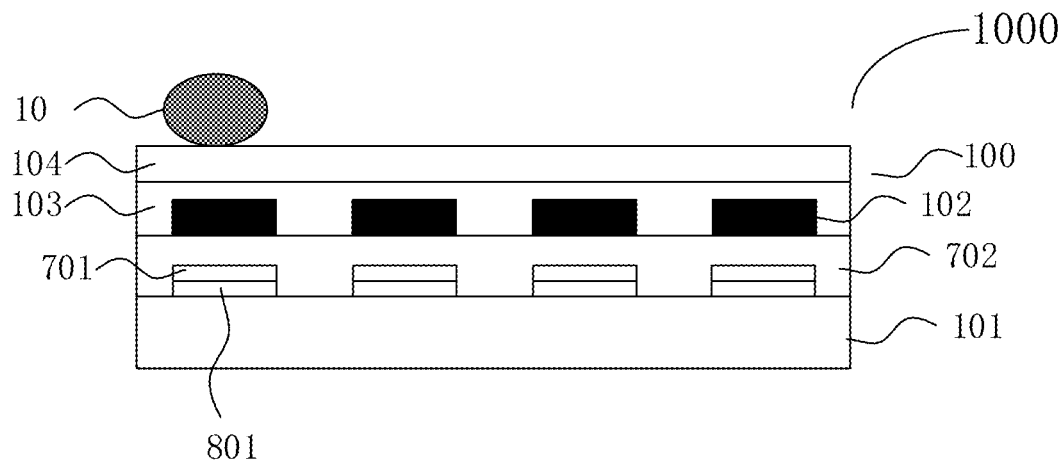
FIG. 9 is a schematic sectional view illustrating the microfluidic device according to some embodiments of the present disclosure.

FIG. 9 is a schematic sectional view illustrating the microfluidic device 1000 taken along line L-L' of FIG. 1 according to some embodiments. FIG. 9 is substantially the same as FIG. 8 except that the microfluidic device 1000 in FIG. 9 does not comprise the substrate 704 but comprises the Bragg film layer 801 serving as the reflective layer. The Bragg film layer has a plurality of patterns arranged in an array on the first base substrate 101. The piezoelectric material layer 702 covers, and is in contact with, both the Bragg film layer 801 and the first base substrate 101. As illustrated in FIG. 9, the projection of the Bragg film layer 801 on the first base substrate 101 at least partially overlaps with the projection of the driving electrode 102 on the first base substrate 101. The Bragg film layer 801 may enable the microfluidic device 1000 to have high mechanical strength and good integration.

Figure 10A:
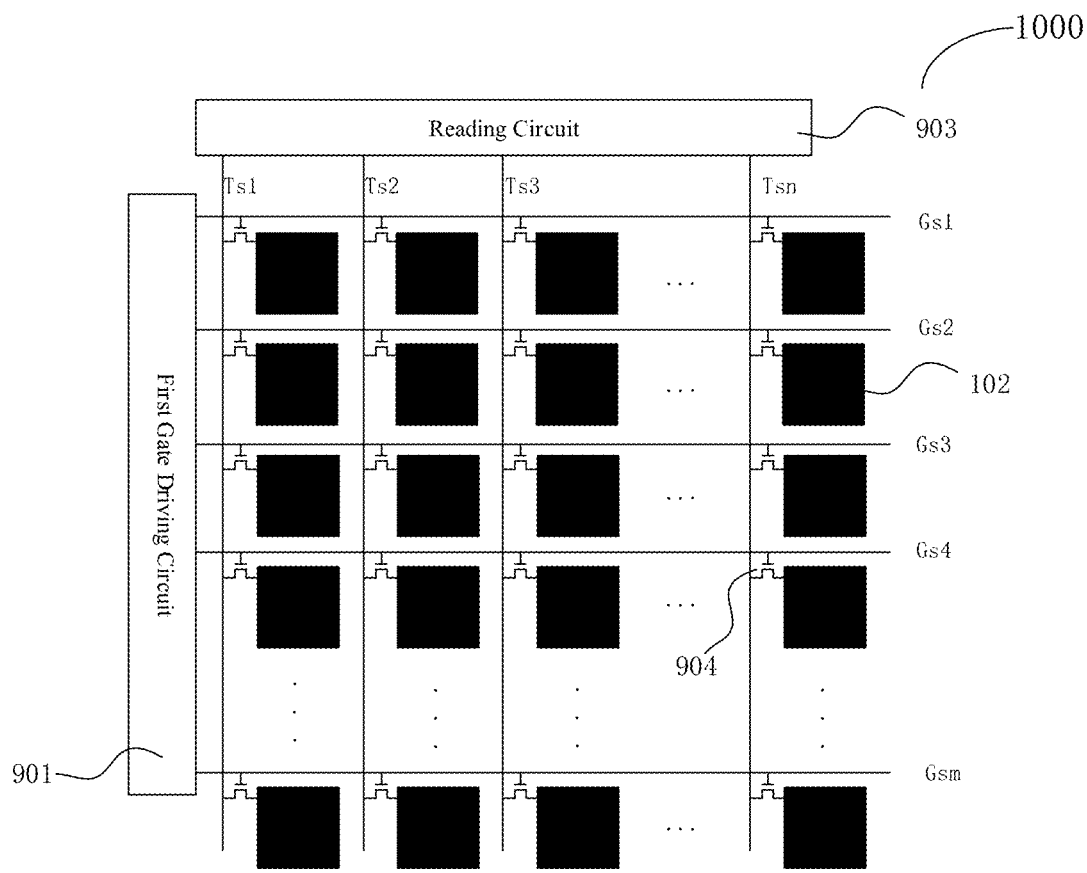
FIG. 10A is a schematic plan view illustrating the driving electrode array according to some embodiments of the present disclosure.
Figure 10B:
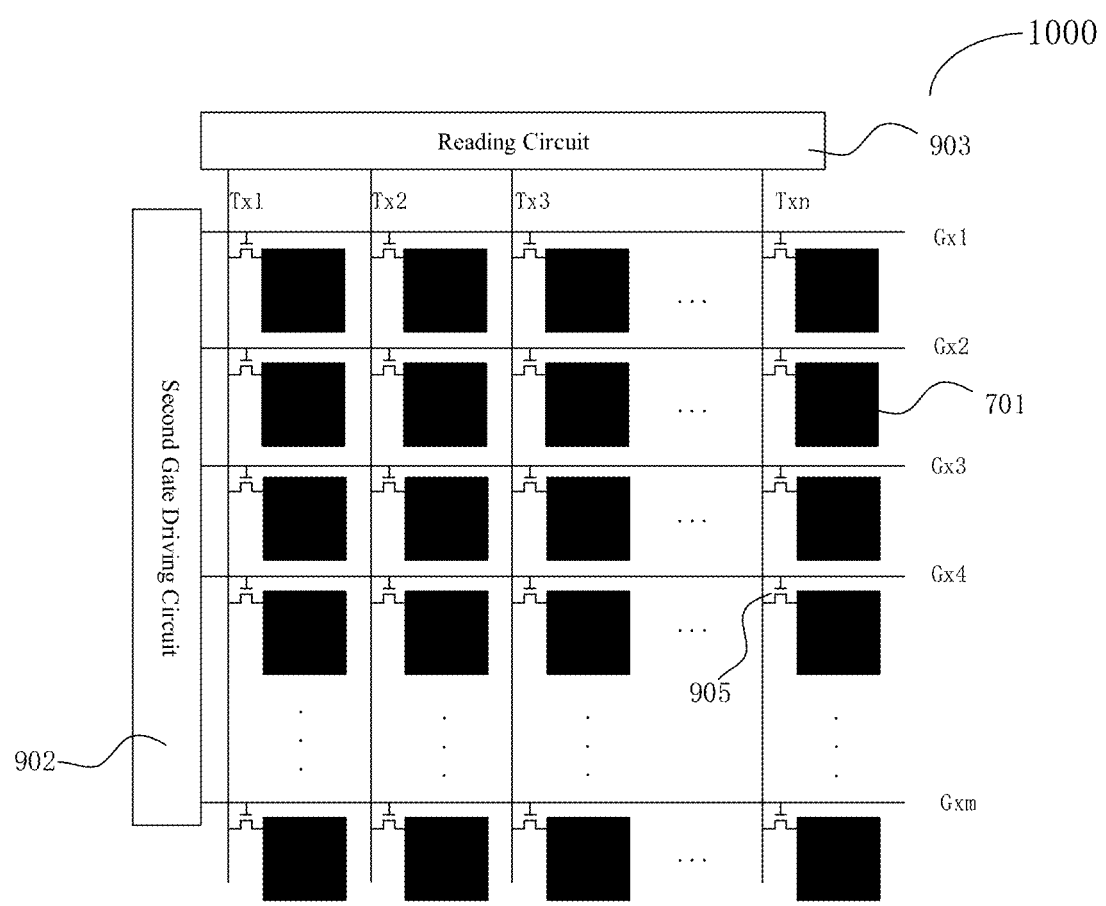
FIG. 10B is a schematic plan view illustrating the auxiliary electrode array according to some embodiments of the present disclosure.

As illustrated in FIGS. 10A-10B, the microfluidic device 1000 according to some embodiments of the present disclosure may further comprise: a plurality of first signal lines Gs1-Gsm, a plurality of second signal lines Ts1-Tsn, a plurality of third signal lines Gx1-Gxm, a plurality of fourth signal lines Tx1-Txn, and a reading circuit 903. The reading circuit 903 is connected to the second signal line Ts and the fourth signal line Tx.

Each position detector further comprises a first switching element 904. The first switching element 904 is configured to enable the conduction between the corresponding driving electrode 102 and the reading circuit 903. For example, the plurality of first switching elements 904 correspond to the plurality of driving electrodes 102 one by one. The first switching element 904 has a gate electrode that is electrically connected to one of the plurality of first signal lines Gs, a first electrode that is electrically connected to one of the plurality of second signal lines Ts, and a second electrode that is electrically connected to the driving electrode 102, such that the first switching element 904 enables the conduction between the driving electrode 102 and the reading circuit 903 via the second signal line Ts under the control of the driving signal of the first signal line Gs. The first signal line Gs may be connected to a first gate driving circuit 901 to transmit the driving signal provided by the first gate driving circuit 901 to the gate electrode of the first switching element 904, so as to turn on or off the first switching element 904. As an example, the first switching element 904 is shown in FIG. 10A as a thin film transistor. However, those skilled in the art will appreciate that the first switching element 904 may also be implemented in other forms, which is not limited in the present disclosure.

Each position detector further comprises a second switching element 905. The second switching element 905 is configured to enable the conduction between the corresponding auxiliary electrode 701 and the reading circuit 903. The second switching element 905 has a gate electrode that is electrically connected to one of the plurality of third signal lines Gx, a first electrode that is electrically connected to one of the plurality of fourth signal lines Tx, and a second electrode that is electrically connected to the auxiliary electrode 701, such that the second switching element 905 enables the conduction between the auxiliary electrode 701 and the reading circuit 903 via the fourth signal line Tx under the control of the driving signal of the third signal line Gx. The third signal line Gx may be connected to a second gate driving circuit 902 to transmit the driving signal provided by the second gate driving circuit 902 to the gate electrode of the second switching element 905, so as to turn on or off the second switching element 905. As an example, the second switching element 905 is shown in FIG. 10B as a thin film transistor, however, those skilled in the art will appreciate that the second switching element 905 may also be implemented in other forms, which is not limited in the present disclosure.

To detect the resonant frequency of the film bulk acoustic resonator structure formed by the driving electrode 102, the piezoelectric material 702, and the auxiliary electrode 701, the first switching element 904 is turned on by providing via the first gate driving circuit 901 a first driving signal to the first switching element 904 connected to the driving electrode 102, such that the driving electrode 102 conducts with the reading circuit 903. Simultaneously, the second switching element 905 is turned on by providing via the second gate driving circuit 902 a second driving signal to the second switching element 905 connected to the auxiliary electrode 701, such that the auxiliary electrode 701 conducts with the reading circuit 903. In this way, the resonant frequency of the film bulk acoustic resonator structure formed by the driving electrode 102, the piezoelectric material 702, and the auxiliary electrode 701 may be obtained via the reading unit 903.

As an example, the reading circuit 903 may be, for example, a circuit that measures a frequency based on a counting method. A circuit that measures a frequency based on a counting method refers to a circuit that may produce a window signal having a frequency much smaller than the frequency of the signal to be measured (that is, a window signal having a period much longer than the period of the signal to be measured), and the frequency of the signal to be measured may be obtained by counting the triggering number of the signal to be measured during the period of the window signal. Optionally, the reading circuit 903 may be a circuit that may produce a pulse period signal having a frequency much smaller than the frequency of the signal to be measured (that is, a pulse period signal having a period much longer than the period of the signal to be measured), and the frequency of the signal to be measured may be obtained by counting the triggering number of the pulse period signal during the effective period of threshold level of the signal to be measured. Optionally, the reading circuit 903 may be a circuit that may phase encode the signal to be measured, and covert changes of the phase into two digital pulse signals having the same frequency but different starting time points, and the frequency of the signal to be measured may be obtained by measuring the period of a digital pulse signal with phase differences, the digital pulse signal with phase differences being produced by triggering the counter to flip via the rising edge of the digital pulse signal. Optionally, the reading circuit 903 may be a combination of the above circuits.

Further, for example, the reading circuit 903 may be a signal selection output circuit that selectively outputs signals of the second signal line Ts and fourth signal line Tx connected thereto. The reading circuit 903 may be connected to an external frequency measuring device (e.g., a vector network analyzer) to measure the resonant frequency of the corresponding film bulk acoustic resonator structure by the external frequency measuring device.

The film bulk acoustic resonator structure formed by the driving electrode 102, the piezoelectric material 702 and the auxiliary electrode 701 has an inherent resonant frequency, which causes the resonant frequency of the film bulk acoustic resonator structure to change when the droplet is located above the driving electrode 102. Thus, when it is measured that the resonant frequency of the film bulk acoustic resonator structure formed by the driving electrode 102, the piezoelectric material 702, and the auxiliary electrode 701 is different from the preset frequency (that is, the inherent resonant frequency of the film bulk acoustic resonator structure), it can be determined that the droplet is located above the particular driving electrode 102.

The first gate driving circuit 901 and the second gate driving circuit 902 may be, for example, directly prepared on the first base substrate 101, or may be prepared as a separate gate driving chip that is then bonded to the first base substrate 101 in a bonding manner. Similarly, the reading circuit 903 may be, for example, directly prepared on the first base substrate 101, or may be prepared as a separate reading chip that is then bonded to the first base substrate 101 in a bonding manner.

With the microfluidic device according to at least one embodiment of the present disclosure, the position of the droplets can be accurately located to facilitate manipulation of the droplets.

Figure 11:
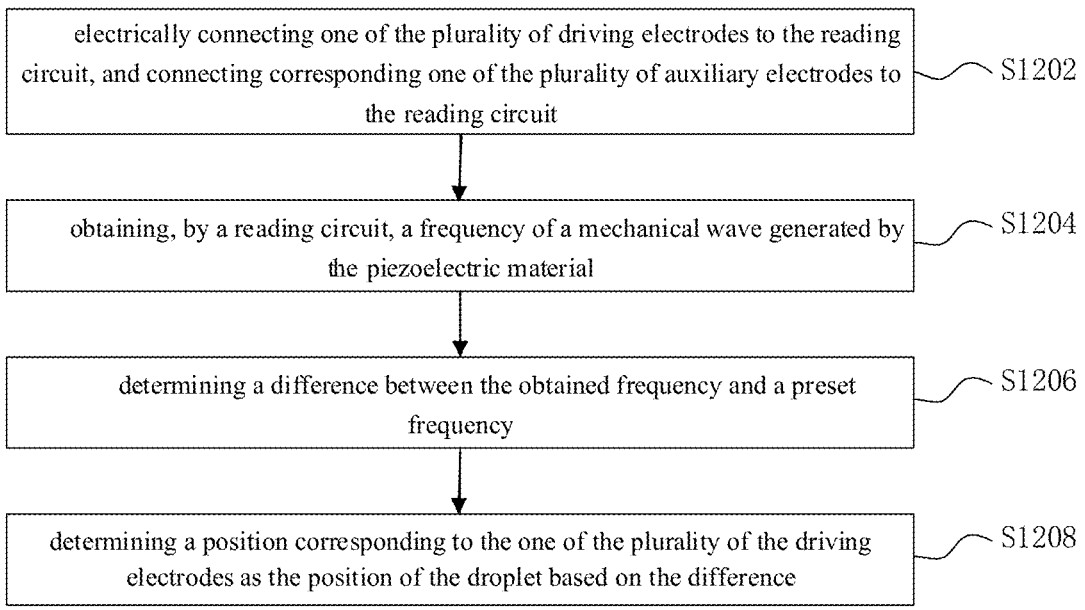
FIG. 11 is a schematic flow diagram illustrating a detection method for the microfluidic device according to some embodiments of the present disclosure.

At least one embodiment of the present disclosure further provides a detection method 1200 for the microfluidic device of the foregoing embodiments, as shown in FIG. 11, which includes:

S1202: electrically connecting one of the plurality of driving electrodes to the reading circuit, and connecting corresponding one of the plurality of auxiliary electrodes to the reading circuit;

S1204: obtaining, by a reading circuit, a frequency of a mechanical wave generated by the piezoelectric material;

S1206: determining a difference between the obtained frequency and the preset frequency;

S1208: determining a position corresponding to the one of the plurality of the driving electrodes as the position of the droplet based on the difference.

The detection method 1200 can be implemented in the microfluidic device according to the embodiment of the present disclosure shown in FIGS. 8 to 10B described above.

In some embodiments of the present disclosure, step S1202 may further include: providing a signal capable of turning on the first switching element on the first signal line corresponding to the driving electrode, and simultaneously providing a signal capable of turning on the second switching element on the third signal line corresponding to the auxiliary electrode.

For example, step S1202 may include: outputting a first driving signal through the first gate driving circuit 901, and transmitting to the first switching element 904 through the first signal line Gs, so that the first switching element 904 is turned on, thereby connecting the driving electrode 102 which is connected to the switching element 904 with the reading circuit 903; and a second driving signal is outputted through the second gate driving circuit 902 and transmitted to the second switching element 905 through the third signal line Gx, so that the second switching element 905 is turned on, thereby connecting the auxiliary electrode 701 which is connected to the second switching element 905 with the reading circuit 903.

In step S1204, the frequency of the mechanical wave generated by the piezoelectric material 702 can be obtained by the reading circuit 903 itself or an external frequency measuring device connected to the reading circuit 903.

In step S1206, the frequency measured in step S1204 can be compared with a preset frequency by a processing unit (e.g., a central processing unit, an application specific integrated circuit, a field gate array circuit, a single chip microcomputer, etc.), and the frequency difference of the measurement may be determined. When the frequency measured is different from the preset frequency, step S1208 is performed.

When it is measured that the resonance frequency of the film bulk acoustic resonator structure formed by the driving electrode, the piezoelectric material, and the auxiliary electrode is different from the preset frequency (that is, the natural resonant frequency of the film bulk acoustic resonator structure), it can be determined that the droplet is above the driving electrode. Therefore, in step S1208, the position corresponding to the driving electrode is determined as the position of the droplet.

The detection method for a microfluidic device according to at least one embodiment of the present disclosure can accurately locate the position of the droplets to facilitate manipulation of the droplets.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Although the disclosure is described in combination with specific embodiments, it is to be understood by the person skilled in the art that many changes and modifications may be made and equivalent replacements may be made to the components without departing from a scope of the disclosure. Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A microfluidic device, comprising:
   a driving substrate configured to drive a movement of a droplet, wherein the driving substrate comprises a base substrate, and a plurality of driving electrodes, located on the base substrate and configured to drive the droplet; and
   a position detector configured to detect a position of the droplet on the driving substrate, wherein the position detector comprises a plurality of droplet detectors, each of the plurality of droplet detectors further comprises:
   an auxiliary electrode between the base substrate and a corresponding driving electrode; and
   a piezoelectric material layer, sandwiched between the auxiliary electrode and the corresponding driving electrode, for generating mechanical waves in response to an electrical field applied thereon.

2. The microfluidic device of claim 1, wherein the position detector comprises:
   an auxiliary substrate disposed above the driving substrate, a surface of the auxiliary substrate being allowed to contact with the droplet during operation; and
   a first optical assembly, comprising:
   a first light source configured to emit light entering the auxiliary substrate from a first side of the auxiliary substrate and cause the light to propagate in the auxiliary substrate in a total reflection manner; and
   a first light receiver configured to receive light exiting the auxiliary substrate from a second side of the auxiliary substrate opposite to the first side.

3. The microfluidic device of claim 2, wherein the position detector further comprises:
   a second optical assembly, comprising:
   a second light source configured to emit light entering the auxiliary substrate from a third side of the auxiliary substrate and cause the light to propagate in the auxiliary substrate in a total reflection manner; and
   a second light receiver configured to receive light exiting the auxiliary substrate from a fourth side of the auxiliary substrate opposite to the third side.

4. The microfluidic device of claim 2, wherein the driving substrate is configured to receive the droplet thereon, and the auxiliary substrate is spaced apart from the driving substrate to form a passage for the movement of the droplet on the driving substrate.

5. The microfluidic device of claim 4, wherein the driving substrate further comprises a first hydrophobic layer facing the auxiliary substrate.

6. The microfluidic device of claim 2, wherein the auxiliary substrate is configured to receive the droplet thereon, and allowing the droplet to move on a surface of the auxiliary substrate facing away from the driving substrate.

7. The microfluidic device of claim 4, wherein the auxiliary substrate further comprises a second hydrophobic layer facing away from the driving substrate.

8. The microfluidic device of claim 1, wherein each of the plurality of droplet detectors further comprises:
   a reflective layer, disposed at a side of the auxiliary electrode away from the piezoelectric material layer, for reflecting mechanical waves generated by the piezoelectric material.

9. The microfluidic device of claim 8, wherein the reflective layer is an air layer and/or a Bragg film layer, and the air layer is formed by etching away a sacrificial material to form an air cavity, and the air cavity is filled with inert gas.

10. The microfluidic device of claim 9, wherein the Bragg film layer has a laminated structure of different acoustic impedance films each having a thickness of ¼ wavelength of mechanical waves generated by the piezoelectric material layer.

11. The microfluidic device of claim 10, wherein the Bragg film layer has a plurality of patterns arranged in an array on the base substrate.

12. The microfluidic device of claim 11, wherein the piezoelectric material layer covers, and is in contact with, both the Bragg film layer and the base substrate.

13. The microfluidic device of claim 12, wherein the driving electrodes are in contact with the piezoelectric material layer, and each one of the driving electrodes is of a dimension larger than a corresponding auxiliary electrode.

14. The microfluidic device of claim 1, further comprising:
   a plurality of first signal lines and a plurality of second signal lines;
   a plurality of third signal lines and a plurality of fourth signal lines; and
   a reading circuit connected to the second signal lines and the fourth signal lines;
   wherein each droplet detector further comprises a first switching element having a gate electrode that is electrically connected to one of the plurality of first signal lines, a first electrode that is electrically connected to one of the plurality of second signal lines, and a second electrode that is electrically connected to the corresponding driving electrode, such that the first switching element enables conduction between the corresponding driving electrode and the reading circuit via the second signal line under the control of the first signal line; and
   each droplet detector further comprises a second switching element having a gate electrode that is electrically connected to one of the plurality of third signal lines, a first electrode that is electrically connected to one of the plurality of fourth signal lines, and a second electrode that is electrically connected to the corresponding auxiliary electrode, such that the second switching element enables conduction between the corresponding auxiliary electrode and the reading circuit via the fourth signal line under the control of the third signal line.

* * * * *